United States Patent [19]
Tanabe et al.

[11] Patent Number: 5,772,144
[45] Date of Patent: Jun. 30, 1998

[54] SEAT BELT RETRACTOR

[75] Inventors: Masahiro Tanabe, Nagahama; Yutaka Yamaguchi, Hikone; Hideo Iseki, Shiga-ken, all of Japan

[73] Assignee: Takata Corporation, Tokyo, Japan

[21] Appl. No.: 523,936

[22] Filed: Sep. 6, 1995

[30] Foreign Application Priority Data

Sep. 7, 1994 [JP] Japan .................................. 6-240730
Dec. 26, 1994 [JP] Japan .................................. 6-337286

[51] Int. Cl.[6] .................................................. B60R 22/28
[52] U.S. Cl. ......................................................... 242/379.1
[58] Field of Search ........................ 242/379.1; 280/805, 280/806; 297/470, 471, 472, 478

[56] References Cited

U.S. PATENT DOCUMENTS

| 4,273,361 | 6/1981 | Takei et al. ........................... 297/470 |
| 4,322,046 | 3/1982 | Tanaka et al. ....................... 242/379.1 |
| 4,323,205 | 4/1982 | Tsuge et al. ......................... 242/379.1 |
| 5,487,562 | 1/1996 | Hedderly et al. ....................... 280/805 |

FOREIGN PATENT DOCUMENTS

| 27 27 470 | 1/1979 | Germany. |
| 39 02 728 | 8/1990 | Germany. |

*Primary Examiner*—John M. Jillions
*Attorney, Agent, or Firm*—Kanesaka & Takeuchi

[57] ABSTRACT

A seat belt retractor is formed of a base frame, a reel shaft rotatably supported by the base frame, a locking member for locking rotation of the reel shaft to prevent the webbing from unwinding at a collision, and an energy absorbing member for absorbing impact energy against a vehicle occupant. The energy absorbing member allows a predetermined length of the webbing to be drawn out with a certain tensile load held on the webbing only when reaction forces acting on the locking member exceed a predetermined threshold.

6 Claims, 12 Drawing Sheets

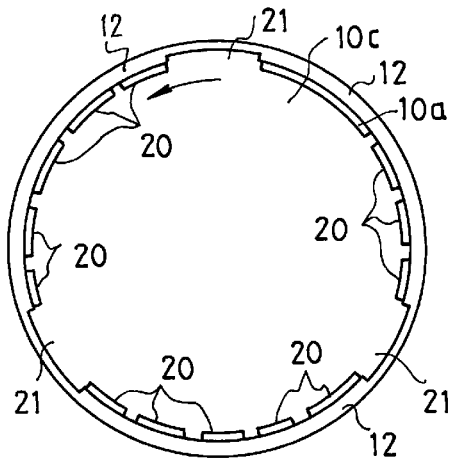
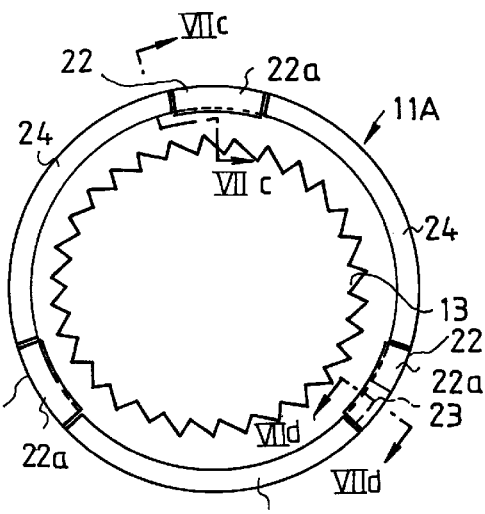
Fig. 6(a)  Fig. 6(b)
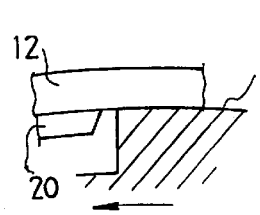 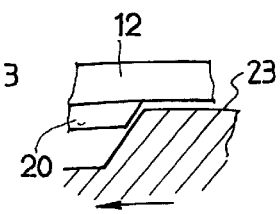 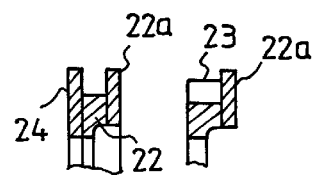
Fig. 7(a)  Fig. 7(b)  Fig. 7(c)  Fig. 7(d)
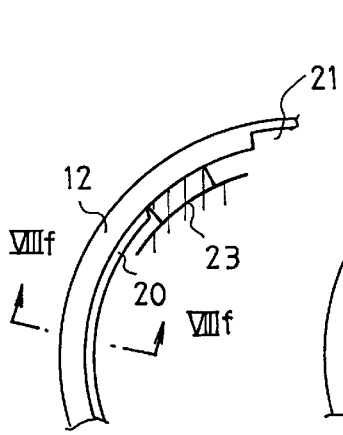 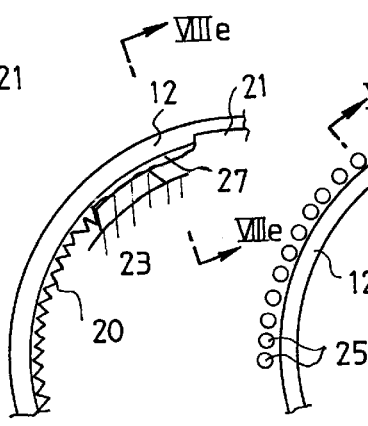 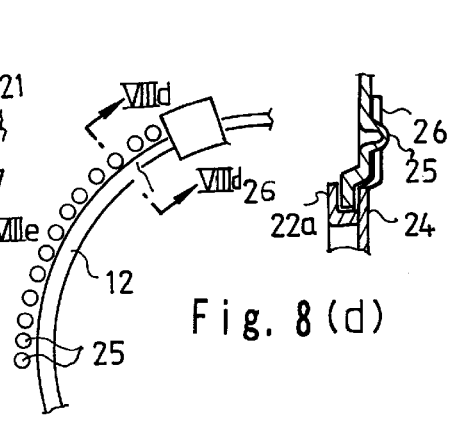
Fig. 8(a)  Fig. 8(b)  Fig. 8(c)  Fig. 8(d)
Fig. 8(e)  Fig. 8(f)

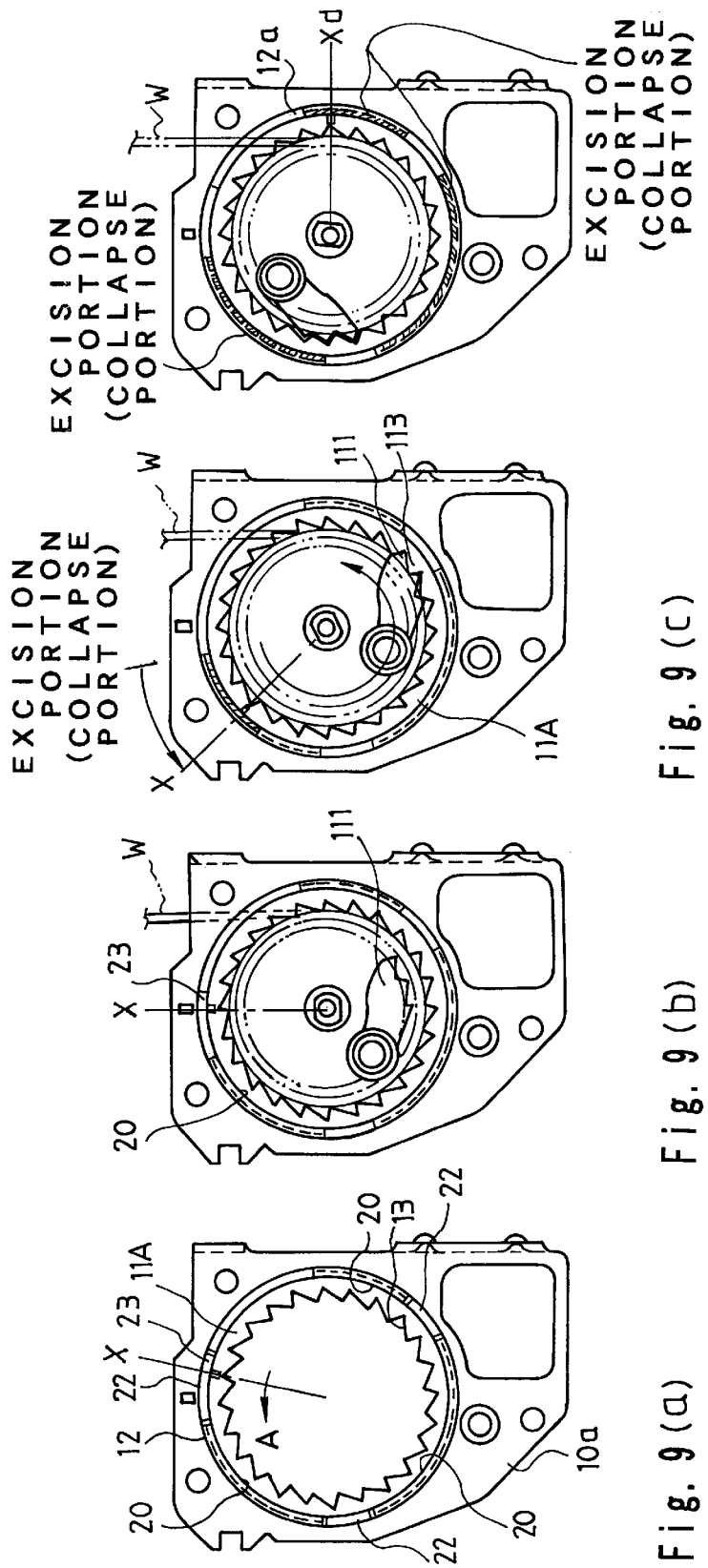

SEAT BELT RETRACTOR

BACKGROUND OF THE INVENTION

The present invention relates to a seat belt retractor which has a mechanism of absorbing impact energy that acts on a vehicle occupant when the vehicle is in a collision.

A seat belt device is a safety device for effectively protecting the vehicle occupant from impacts generated during a collision.

A typical conventional seat belt device is mainly composed of a webbing, a retractor for winding up the webbing and accommodating it therein, and a buckle for fixing a tongue, which is mounted to the webbing, to a vehicle body. The webbing is a belt made of a fabric having approximately a 50 mm width, which is standardized by Japanese Industrial Standard. The retractor is structured to wind up the webbing around a reel shaft by spring force to accommodate the webbing. As for the retractor, ones called Emergency Locking Retractor (hereinafter, referred to as "ELR") have come into wide use. The ELR can prevent the unwinding of the webbing wound around the reel shaft when impact forces exceeding a predetermined threshold act on the ELR.

A seat belt device with the ELR can securely restrain sudden forward movement of the occupant because the webbing is prevented from unwinding from the ELR in a collision. The mechanism for preventing the unwinding of the webbing may be a mechanism for stopping the rotation of the reel shaft on which the webbing is wound (see Japanese Published Unexamined Patent No. H7(1995)-144606), a mechanism for directly clamping the webbing, or the like.

A seat belt retractor disclosed in Japanese Published Unexamined Patent No. H7(1995)-144606 will be now described about the structure and the mechanism for preventing the unwinding of the webbing with reference to FIG. 1 through FIG. 3.

FIG. 1 is a perspective view showing a base frame 101 employed in a conventional frame locking mechanism. In the frame locking mechanism, the base frame 101 has internal teeth 113 around the peripheries of openings 103a and 103b thereof for supporting a reel shaft 102. The reel shaft 102 around which the webbing is wound is provided with pawls 111 and 114 on the sides thereof as shown in FIG. 2. The pawls 111, 114 engage with some of the internal teeth 113 to prevent the rotation of the shaft in the webbing unwinding direction.

FIG. 2 is an end view showing a portion of the inside of the seat belt retractor. The base frame 101 is formed in a U-like shape in its plan view by a press working. The reel shaft 102 is accommodated between side walls 101a and 101b of the base frame 101. The reel shaft 102 has a shaft portion at the center thereof, around which the webbing is wound. The reel shaft 102 has guide flanges 102a, 102b on the both sides thereof. The guide flanges 102a, 102b are rotatably fitted into the openings 103a and 103b formed in the side walls 101a and 101b.

A biasing means 105 is mounted on the outer surface of the side wall 101b to bias the reel shaft 102 in the webbing winding direction. A frame locking mechanism is mounted on the outer surface of the other side wall 101a and is all covered by a lock gear cover 106. Inside the lock gear cover 106, a lock gear 107 is rotatably attached to a shaft end of the reel shaft 102. An inertia member 108 is mounted on the lock gear 107 through a pin hole 108b. A control spring 109 is disposed between the inertia member 108 and the lock gear 107.

As shown in FIG. 3, a joint pin 110 is inserted in a through hole 102c of the reel shaft 102. A supporting end of a main pawl 111 is pivotally mounted to an end of the joint pin 110. The main pawl 111 is incorporated into the guide flange 102a of the reel shaft 102. The other end of the main pawl 111 can engage with some of the internal teeth 113 of the opening 103a. A backup pawl 114 is fixed to the other end of the joint pin 110 opposite to the end to which the main pawl 111 is attached. The backup pawl 114 engages with some of the internal teeth 113 of the opening 101b. A deceleration sensing means 115 is incorporated into a lower portion of the side wall 101a.

The description will now be made as regard to the operation of the frame locking mechanism for preventing the unwinding of the webbing with reference to FIG. 2.

When a deceleration exceeding a predetermined threshold acts on the vehicle while driving, an inertia member 116 in the deceleration sensing means 115 tilts (see FIG. 3). A trigger 117 positioned above the inertia member 116 pivots slightly upwardly as shown in the two-dot chain line in FIG. 2. At this point, the occupant moves forward so that the webbing W is slightly unwound. That is, the reel shaft 102 on which the webbing W is wound and the lock gear 107 rotating coaxially with the reel shaft 102 are rotated in the webbing unwinding direction (the direction a in FIG. 3). At this point, external teeth 107a formed around the periphery of the lock gear 107 are engaged with a pallet of the trigger 117 to prevent the rotation of the lock gear 107. As a result, only the reel shaft 102 slightly rotates in the direction a. Accordingly, a cam follower 111a of the main pawl 111 is guided outwardly along a cam hole 107b formed in the lock gear 107 to pivot the main pawl 111. Thereby the teeth 111b of the main pawl 111 engage with some of the internal teeth 113 of the opening 101a of the base frame 101. At the same time, a cam follower 110a of the joint pin 110 is guided outwardly along the cam hole 107c, thereby rotating the joint pin 110. The rotation of the joint pin 110 outwardly pivots the backup pawl 114 fixed to the other end of the joint pin 110. The teeth of the backup pawl 114 then engage with some of the internal teeth 113 of the opening 101b. The main pawl 111 and the backup pawl 114 engage with some of the internal teeth 113 of the openings 101a and 101b of the base frame 101 by individual pivoting mechanisms, respectively.

However, the reel shaft 102 and the lock gear 107 are suddenly rotated in the direction a according to the unwinding of the webbing W. On the other hand, the inertia member 108 positioned on the surface of the lock gear 107 slightly rotates later in the direction δ due to the inertia to reach a position shown by the two-dot chain line. The further rotations of the reel shaft 102 and the lock gear 107 in the direction a make a pallet 108a of the inertia member 108 to be engaged with some of internal teeth 106a formed around the inner peripheral wall of the lock gear cover 106, thereby preventing the rotation of the lock gear 107 fitted with the inertia member 108. Therefore, only the reel shaft 102 rotates so that the main pawl 111 engages with some of the internal teeth 113 similarly to the aforementioned case. In addition, the backup pawl 114 engages with some of the internal teeth 113, thereby completely preventing the rotation of the reel shaft 102.

By the way, as the webbing W is prevented from unwinding to suddenly restrain the body of the occupant, impact forces act on the occupant through the webbing W.

To absorb the impact forces acting on the occupant, a means for slightly lengthening the unwound webbing at the instant when the occupant is restrained by the webbing W is effective. That is, just after the ELR prevents the unwinding of the webbing W, a predetermined length of the webbing W is drawn out with a certain tensile load held on the webbing W, thereby absorbing the impact energy that acts on the occupant. It should be noted that the operation for absorbing the impact energy by this means is referred to as "EA (Energy Absorbing) operation" and the effect of the EA operation is referred to as "EA effect" hereinafter in this specification.

In one of seat belt retractors which can provide the EA effect, the diameter of the reel shaft 102 on which the webbing W is wound is reduced by plastic deformation of the shaft portion. In the retractor of this type, the webbing W can be drawn out since the length of the wound webbing W is also reduced according to the reduced diameter of the shaft 102.

However, as for the seat belt retractor having the aforementioned frame locking mechanism, the reel shaft 102 decreases the stiffness in the direction of the shaft.

As a result, the plastic deformation of the portion of the reel shaft 102 occurs, so that the whole shaft and the rotary shaft of the pawls become out of position. In the most terrible case, the frame locking mechanism can not be operated.

SUMMARY OF THE INVENTION

It is therefore an object of the present invention to provide a seat belt retractor wherein a predetermined length of a webbing can be drawn out with the EA effect held on the webbing and with a frame locking mechanism in operation without the decrease in the stiffness of a reel shaft.

For accomplishing the above mentioned object, the present invention provides a seat belt retractor comprising a reel shaft around which a webbing is wound, a base frame having sides and supporting the reel shaft between the sides, ring members attached to the sides and each having internal teeth around the periphery thereof locking means mounted on the reel shaft, which normally allows rotation of the reel shaft and, in operation, locks the webbing from unwinding upon stopping the reel shaft from rotating in a webbing unwinding direction by engaging with some of the teeth of the ring member, deceleration sensing means for sensing when a deceleration exceeding a predetermined threshold acts on a vehicle, and lock operating means for operating the locking means according to the operation of the deceleration sensing means, wherein when the locking means and the teeth of the ring members engage with each other to lock the webbing from unwinding and a tensile load exceeding a predetermined degree acts on the webbing, the ring members rotate in the webbing unwinding direction with a predetermined tensile load held on the webbing.

It is preferable that the ring members rotate in the webbing unwinding direction while excising projections formed on the sides of the base frame.

It is also preferable that the ring members rotate in the webbing unwinding direction while deforming projections formed on the sides of the base frame.

It is preferable that the ring members rotate in the webbing unwinding direction with at least one resistance wire deformed by a wire-withdrawal stopper disposed in the base frame, an end of the resistance wire being fixed to a portion of an outer periphery of the ring member.

It is preferable that the ring members have external teeth formed around at least one of outer peripheries thereof and at least one plate spring fixed to an inner surface of the base frame at a predetermined position, and wherein the ring members rotate in the webbing unwinding direction with the plate spring pushed by the external teeth.

In the invention, it is preferable that the locking means comprises a main pawl which is capable of engaging with some of internal teeth of one of the ring members by the operation of the lock operating means and a backup pawl which is fixed to a transmitting means for transmitting rotation of the lock operating means and is capable of engaging with some of internal teeth of the other of the ring members by the rotation transmitted through the transmitting means, and wherein the both ring members are fitted into corresponding openings of the base frame, respectively.

BRIEF DESCRIPTION OF THE DRAWINGS

FIG. 6(a) is a front view showing an example of a structure of a base frame in which an EA gear is fitted and FIG. 6(b) is a front view showing an example of the EA gear composing an EA member;

FIGS. 7(a) and 7(b) are partially exploded views each showing an example of a forcing member formed on the EA gear and FIGS. 7(c)–7(d) are partially exploded sectional views each showing of a the forcing member;

FIGS. 8(a)–8(c) are partially enlarged front views showing variations of collapse projections which are formed around the inner periphery of an opening, and FIGS. 8(d)–8(f) are partially enlarged sectional views showing variations of collapse projections;

FIGS. 9(a)–9(d) are explanatory views illustrating the EA operation of the seat belt retractor fitted with the EA member according to the first embodiment;

DESCRIPTION OF THE PREFERRED EMBODIMENTS

Hereinafter, embodiments of the seat belt retractor of the present invention will be described referring to the attached drawings.

(First Embodiment)

Figure 4:
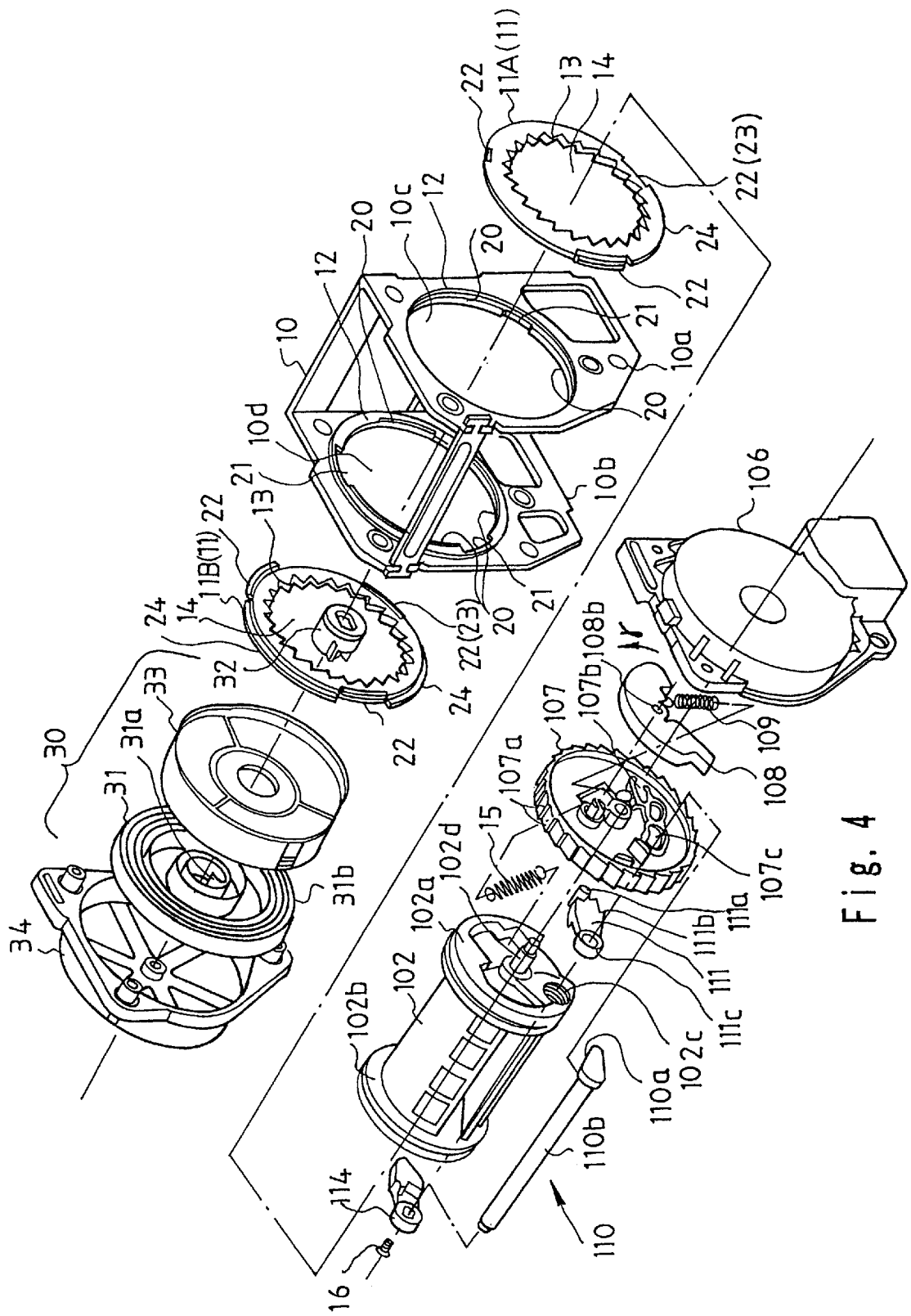
FIG. 4 is an exploded perspective view in explaining the structure of a first embodiment of a seat belt retractor according to the present invention.
Figure 5:
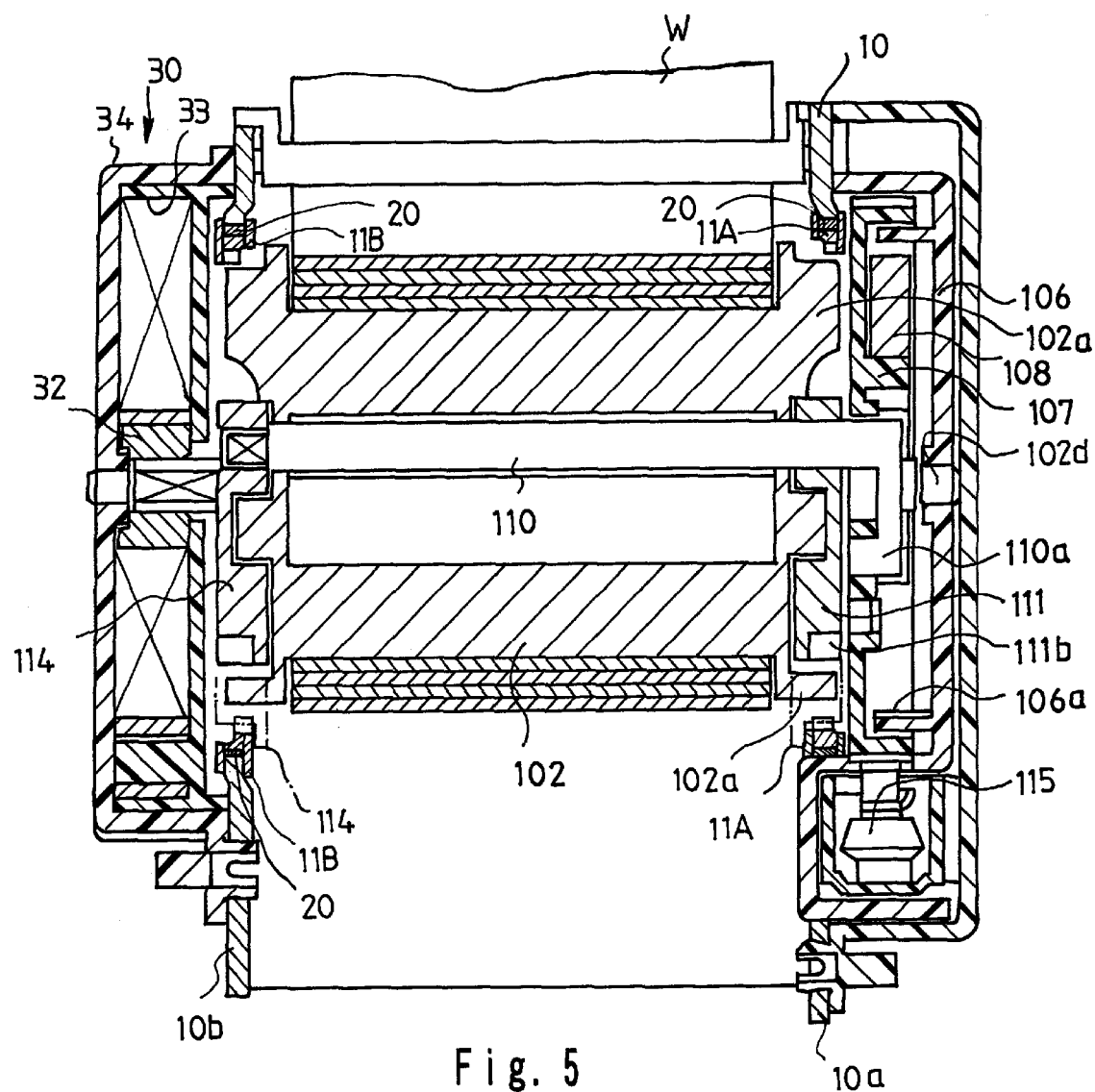
FIG. 5 is a transverse sectional view showing the inside of the seat belt retractor shown in FIG. 4.

FIG. 4 is an exploded perspective view in explaining the structure of the seat belt retractor. FIG. 5 is a sectional view showing the structure in which an EA member (characterizing this invention) is incorporated.

In FIG. 4 and FIG. 5, the same parts as the conventional one as mentioned above are designated by the same numerals.

In FIG. 4, EA gears 11 as ring members are rotatably fitted into side walls 10a, 10b of a base frame 10, respectively. The numeral 11 is a general numeral for the right and left of the EA gears in this specification. To specify the right or left of the EA gears, "the right EA gear 11A" or "the left EA gear 11B" will be used. The base frame 10 has openings 10c, 10d formed in the side walls, in which the EA gears 11 are fitted. Each of the openings 10c, 10d has a step 12 formed around the inner periphery thereof as shown in FIG. 5. The step 12 has collapse projections 20 around the inner peripheries thereof, while each of the EA gears 11 has a forcing member 23 formed on the periphery thereof.

The collapse projections 20 are excised or collapsed by the forcing members 23 of the EA gears 11 according to rotation of the EA gears 11. By resistance generated from the excision or collapse of the collapse projections 20, the tensile load of the webbing is held in a certain value (EA load) within a predetermined range allowing rotation of a webbing reel shaft. Also a predetermined length of the webbing W is drawn out. The structure of the EA gears 11 and the forcing member 23 will be described later referring to FIG. 6.

The structure of a frame locking mechanism will now be described referring to FIG. 4 and FIG. 5.

Figure 1:
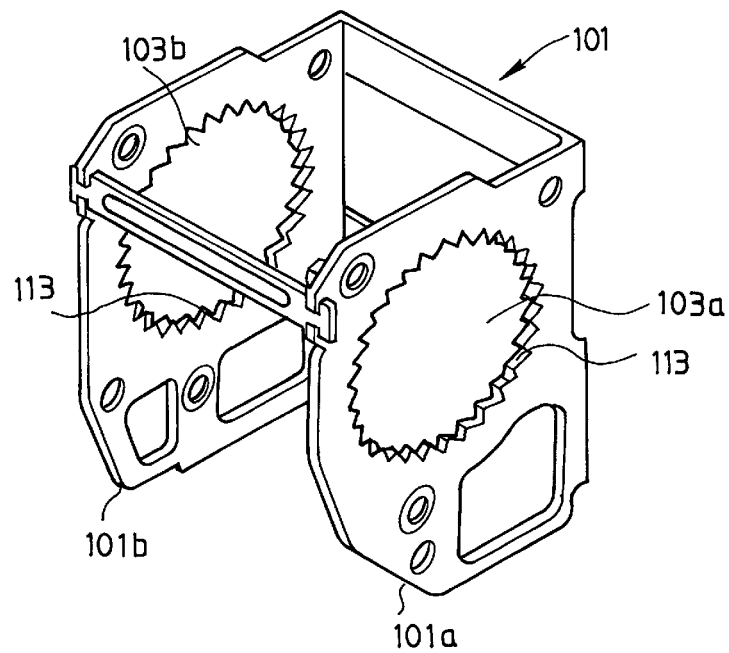
FIG. 1 is a perspective view showing an example of a base frame employed in a conventional seat belt retractor having a frame locking mechanism.
Figure 3:
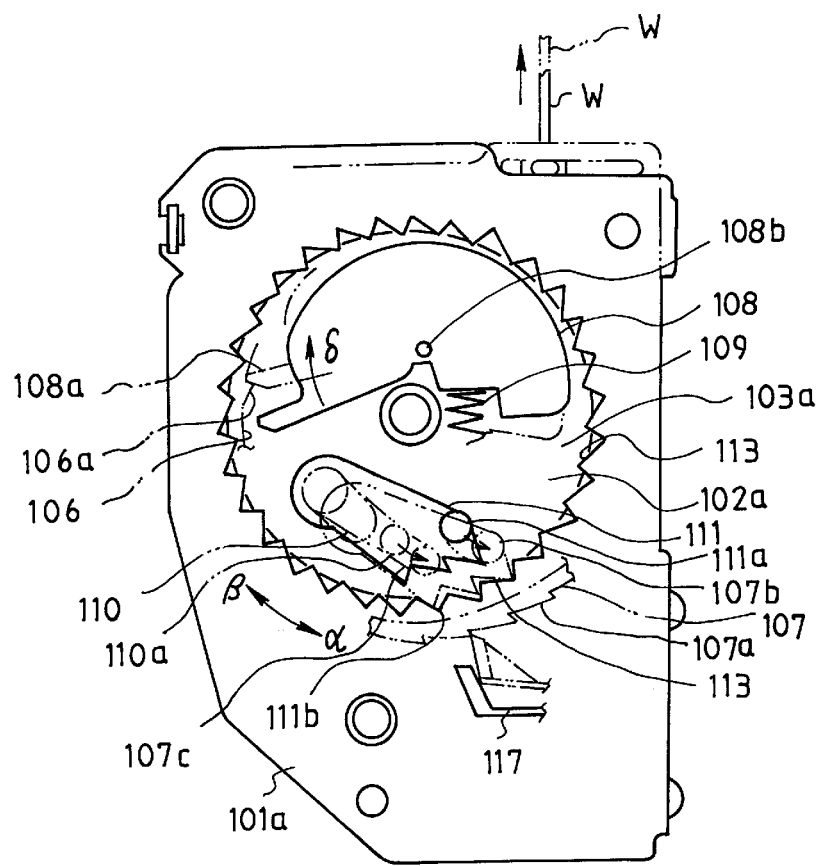
FIG. 3 is an explanatory view showing the conventional seat belt retractor shown in FIG. 2, with the frame locking mechanism thereof in operation for locking unwinding of a webbing.
Figure 2:
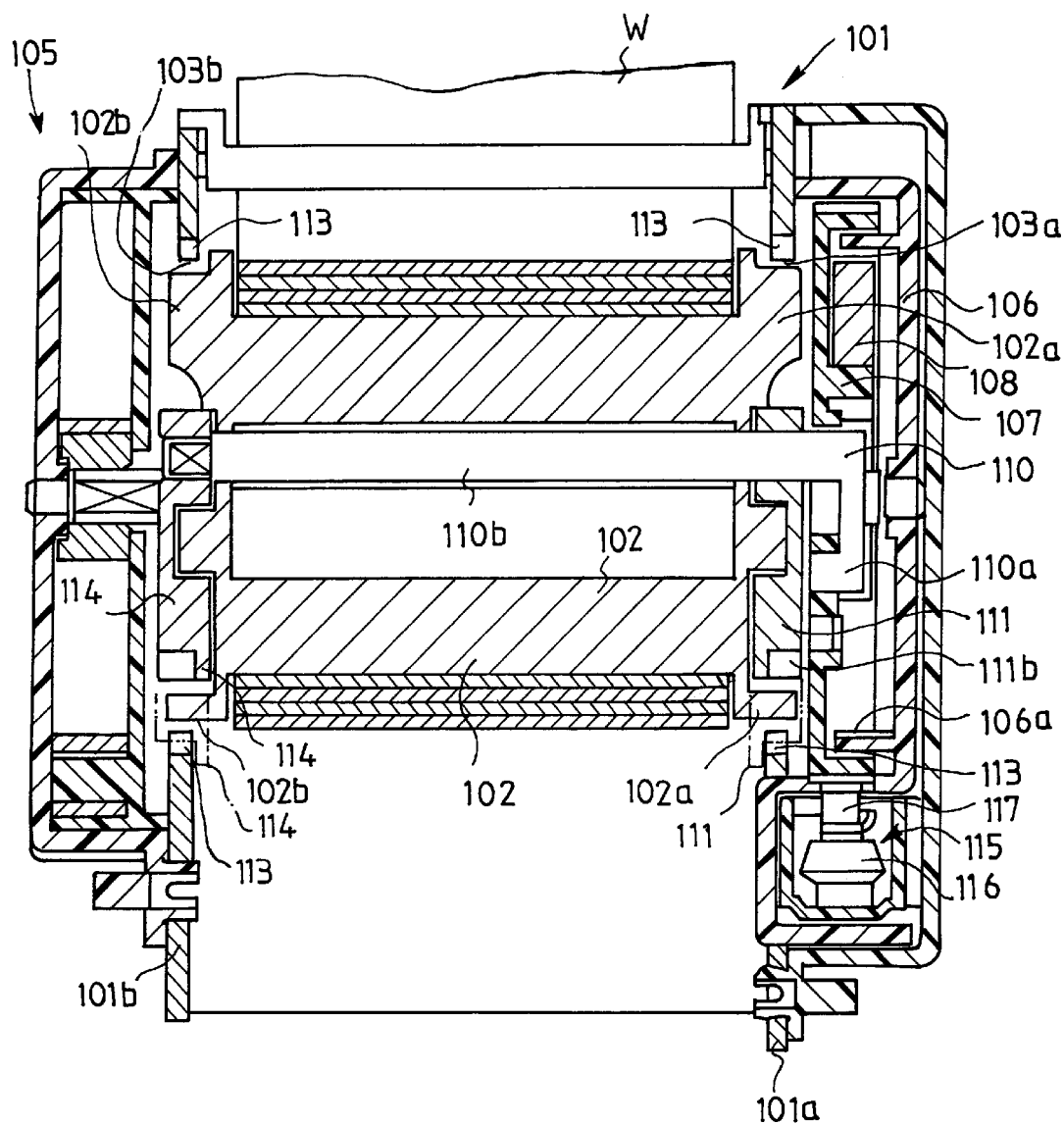
FIG. 2 is a sectional view showing an example of a conventional seat belt retractor having a frame locking mechanism.

The frame locking mechanism which is mainly composed of locking means and lock operating means locks a reel shaft 102 from rotating in the webbing unwinding direction. The reel shaft 102 has the same structure as one shown in FIG. 2. That is, the reel shaft 102 has guide flanges 102a, 102b on the both sides thereof. The guide flanges 102a and 102b are fitted in the openings 14 formed in the EA gears 11. The reel shaft 102 is rotatably supported by the base frame 10.

The frame locking mechanism is all covered by a lock gear cover 106. Inside the lock gear cover 106, a lock gear 107 is rotatably attached to a shaft end 102d of the reel shaft 102. An inertia member 108 is pivotally mounted on the lock gear 107 through a pin hole 108b. A control spring 109 is disposed between the inertia member 108 and the lock gear 107 so that the inertia member 108 is always biased by the control spring 109 in the direction γ (see FIG. 4). The above components compose the lock operating means.

A joint pin 110 as transmitting means is inserted into a cam hole 107c formed in a surface of the lock gear 107, a pin hole 111b of a main pawl 111, and a through hole 102c of the reel shaft 102. A back up pawl 114 is fixed to an end of the joint pin 110 by a set screw 16.

A main pawl 111 is rotatably attached to the joint pin 110 and is all accommodated in the guide flange 102a of the reel shaft 102. The main pawl 111 has a cam follower 111a on the surface thereof. The cam follower 111a is loosely fitted in a cam hole 107b of the lock gear 107. The main pawl 111 is allowed to engage with some of internal teeth 13 formed around the opening 14 of the EA gear 11A in the same way as the conventional one.

A backup pawl 114 is accommodated in a recessed portion in the outer surface of the left guide flange 102b of the reel shaft 102. The backup pawl 114 is allowed to engage with some of internal teeth 13 formed around the opening 14 of the EA gear 11B by rotation of the joint pin 110.

A pawl spring 15 is disposed between the reel shaft 102 and the lock gear 107. The pawl spring 15 is tensioned so that the lock gear 107 normally has a predetermined angle to the reel shaft 102 not to engage the main pawl 111 to the internal teeth 13. As a result, the cam follower 111a of the main pawl 111 is held in the initial position in the cam hole 107b of the lock gear 107.

A biasing means 30 is mounted on the outer surface of the side wall 10b to bias the reel shaft 102 in the webbing winding direction. The biasing means 30 comprises a power spring 31 made up of a spiral spring, a bush 32 fixed to the inward end of the power spring 31 for transmitting spring forces of the power spring 31 to the reel shaft 102, spring casing 33 fixed to the outward end of the power spring 31 for covering the whole power spring 31, and a cover 34 for covering the spring casing 33 and the power spring 31.

Referring to FIGS. 6(a), 6(b) and FIGS. 7(a), 7(b), the description will now be made as regard to the structure of the EA gears and the peripheries of the openings of the base frame (hereinafter, the description will be made only with respect to the side wall 10a.).

The opening 10c of the side wall 10a has the step 12 formed around the inner periphery thereof by punching. The step 12 has three cutouts formed at intervals in the peripheral direction. The step 12 is provided with the collapse projections 20 disposed at a predetermined interval around the inner periphery thereof. As the EA gear 11A rotates in the arrow direction as shown in FIG. 7(a), the collapse projections 20 are excised or collapsed by the forcing member 23 of the EA gear 11A.

FIG. 6(b) shows the EA gear 11A to be fitted into the opening 10c shown in FIG. 6(a). The EA gear 11A has three positioning claws 22 corresponding to the cutouts 21 of the step 12. As shown in FIG. 7(c), the positioning claws 22 are each provided with a side guide 22a for sandwiching the step 12. The EA gear 11A also has three collars 24 each formed between the adjacent positioning claws 22 on the outer periphery thereof. By engaging the collars 24 to the step 12, the EA gear 11A is securely fitted into the base frame 10.

One of the positioning claws 22 has the forcing member 23 as shown in FIG. 7(d). The forcing member 23 is a projection having a rectangular section. The forcing member 23 comes to contact with one of the projections 20 formed on the inner periphery of the step 12 when the EA gear 11A rotates integrally with the reel shaft 102. As rotating forces further act on the EA gear, the forcing member 23 shears the projections 20.

FIG. 7(a) and FIG. 7(b) show the configurations of the forcing member 23 as seen from the side thereof. The forcing member 23 shown in FIG. 7(a) has a front surface, to be in contact with the projection 20, standing vertically. The forcing member 23 shears the projection 20 formed on the step 12 shown in FIG. 8(f) after reaching the projection 20.

On the other hand, the forcing member 23 shown in FIG. 7(b) has a sloping front surface. There is a narrow space between the forcing member 23 and the step 12. When the projections 20 are collapsed by the forcing member 23, this space allows collapsed portions 27 (see FIGS. 8(b) and 8(e)) to pass between the forcing member 23 and the step 12.

As mentioned above, upon suitably setting the slope of the front surface of the forcing member 23 and the space between the step 12 and the forcing member 23, the EA operation is performed by different dynamic behavior such as shearing or compression.

The internal teeth 13 which the main pawl 111 engages are disposed approximately 3° out of phase in the direction a with the internal teeth 13 which the backup pawl 114 engages. As a result, the main pawl 111 and the backup pawl 114 independently and securely engage with some of the internal teeth 13 of the EA gear 11.

FIGS. 8(a)–8(c) show variations of the projections 20 formed around the step 12. FIG. 8(e) illustrates the projection 20 in the collapsed state. In FIG. 8(a), the projections 20 are formed in a thin continuous strip-like configuration which is different from the intermittent mount-like configuration of the projections 20 shown in FIG. 6(a). The projections 20 shown in FIG. 8(a) has a section as shown in FIG. 8(f). In case of FIG. 8(a), the projections 20 are excised by shearing in the same way as the case of FIG. 7(a).

The projections 20 shown in FIG. 8(b) are formed as continuous small triangles around the inner periphery of the step 12. In this case, the projections 20 are collapsed as shown in FIG. 8(e). The projections 20 shown in FIG. 8(c) are made up of consecutively punched projections 25 formed around the periphery of the opening of the base frame 10 by pressing, the section of which is shown in FIG. 8(d). The punched projections 25 are excised by a shearing plate 26 mounted to the EA gear 11.

The projections 20 are not limited to be formed integrally with the base frame 10 and may be wire rods made of steel wire or the like fixed along the inner periphery of the step 12. The wire rods may be sheared or collapsed by the forcing member 23 of the EA gear 11.

The EA gear may be fitted into the base frame 10 by forcibly threading a screw thread formed around the outer periphery of the EA gear 11 into a screw thread formed around the periphery of the opening of the base frame, the pitches of which are different from each other. Then, the EA gear 11 may be rotated by deforming the screw thread.

Referring to FIGS. 9(a)–9(d) and FIG. 10, the description will now be made as regard to the relation between the EA load and the process of shearing or collapsing the projections 20.

The positioning claws 22 of the EA gear 11A are aligned to the positions of the three cutouts 21 formed on the periphery of the opening of the base frame 10 and the EA gear 11A is then fitted into the side wall 10a. In this state, as shown in FIG. 9(a), the step 12 of the base frame 10 is sandwiched between the positioning claws 22 and the collars 24 of the EA gear 11A so that the base frame 10 and the EA gear 11A are integrated (the base frame 10 and the EA gear 11B are also integrated in the same way.). In this embodiment, upon rotating the EA gear 11A in the direction A, the forcing member 23 of the EA gear 11A (the mark X represents the rotating position) comes to contact with one of the projections 20 of the base frame 10.

In the state shown in FIG. 9(b), the seat belt retractor freely allows unwinding or winding of the webbing W except when rapid unwinding of the webbing W and/or a large deceleration acts on the seat belt retractor.

When the deceleration sensing means 115 (see FIG. 5) senses a large deceleration and/or the webbing W is rapidly unwound, the lock gear 107 stops its rotation. Then, the main pawl 111 rotatably mounted to the reel shaft 102 rotates to engage with some of the inertial teeth 13 of the EA gear 11A. At substantially the same time, the backup pawl 114 engages with some of the inertial teeth 13 of the EA gear 11B. As a result of this, the reel shaft 102 is stopped from rotation and is integrated with the EA gears 11 through the main pawl 111 and the backup pawl 114.

At this point, reaction forces for stopping the rotation of the reel shaft 102 act on the EA gears 11. However, the EA gears 11 do not rotate against the peripheries of the openings 10c, 10d of the base frame 10 even with the reaction forces below a certain degree because the positioning claws 22 and the forcing members 23 of the EA gears 11 are integrally engaged to the collars 24 and the projections 20 of the base frame 10.

When large unwinding forces further act on the webbing W, the load of the reaction forces for rotating the EA gears is also increased. As the load of the reaction forces reaches the EA load, the EA gears 11 rotate to allow the forcing members 23 to shear the projections 20. According to the configuration of the forcing member 23, the EA gears 11 rotate to allow the forcing members 23 to collapse the projections 20. The EA gears 11 rotate in the webbing unwinding direction with a certain tensile load held on the webbing W (see FIG. 9(c)).

After that, the EA gears 11 rotate to shear or collapse the projections 20 of the steps 12 of the base frame 10 by the forcing members 23. After the forcing members 23 of the EA gears 11 shear or collapse all of the projections 20 around the peripheries of the openings, the forcing members 23 come to contact with steps 12a (see FIG. 9(d)) on which no projection is formed. As a result of this, the rotation of the EA gears 11 is stopped so that the EA operation is finished. After that, the webbing W is slightly elongated because of shrinkage of the webbing by the reel shaft 102 and the tensile load of the webbing W is increased.

Figure 10:
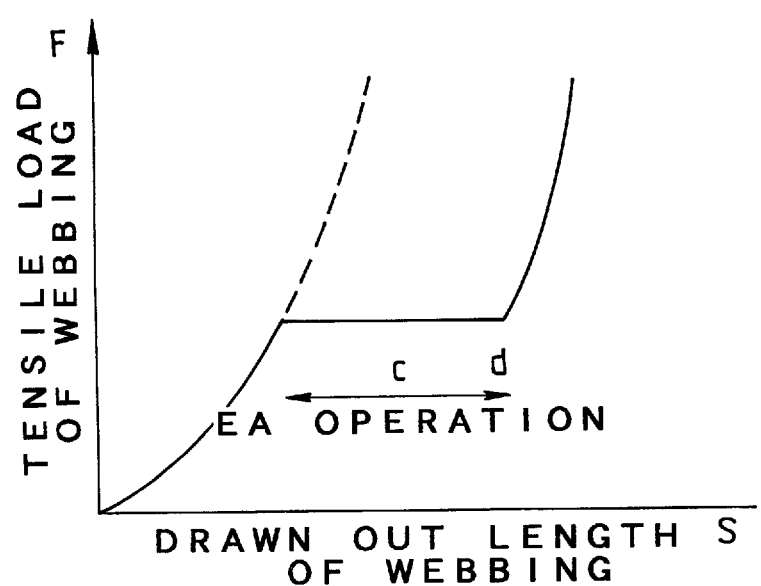
FIG. 10 is a graphical representation showing the relation between the tensile load and the drawn out length of the webbing during the EA operation.
Figure 11:
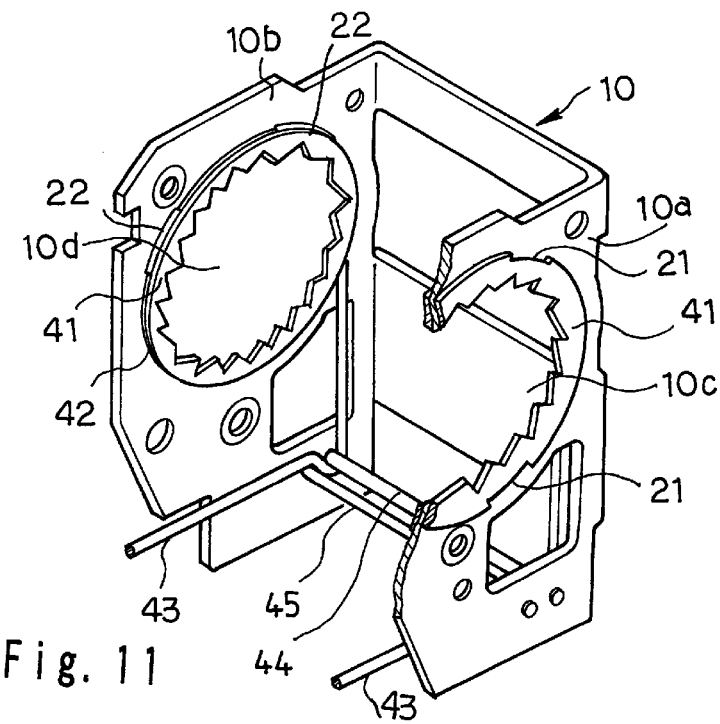
FIG. 11 is a partial perspective view showing an example of a structure of the base frame, in which an EA gear and an EA wire of an EA member are incorporated, according to a second embodiment.

FIG. 10 is a characteristic curve showing the relation between the tensile load and the drawn out length of the webbing in the states shown in FIGS. 9(a)–9(d). As shown in FIG. 10, the seat belt retractor according to the present invention can provide a sufficient drawn out length (approximately 100 mm in this embodiment) of the webbing W with the predetermined EA load acting on the webbing W. In addition, since the EA gears 11 are incorporated in the frame locking mechanism, the EA effect is provided in a relative initial stage. Therefore, it is effective particularly in a small space such as in a vehicle cabin.

The above description was made as regard to the pawls employed in the conventional frame locking mechanism and the EA gears having saw-teeth capable of engaging with the pawls. The technical idea of the present invention can be applied to a case of employing EA gears corresponding to another configuration of pawls. That is, when the EA gears having another configuration are fitted into the openings of the base frame, EA members (collapse members) which can be excised by shearing or deformed by collapse are disposed, thereby providing the same EA effect.

In this embodiment, the seat belt retractor is designed so that the main pawl and the backup pawl engage with some of the inertial teeth. Therefore, the both openings have projections around the peripheries thereof. However, the present invention can be applied to a case of employing only one pawl. In this case, the configuration of the projections is preferably set to have the desired EA load with only one projection.

(Second Embodiment)

Referring to FIG. 11 and FIGS. 9(a)–9(d), the description will now be made as regard to the structure of EA gears and EA wires as a second embodiment.

Each of EA gears 41 employed in this embodiment comprises wire grooves 42 formed along the outer peripheries thereof in addition to the components of the EA gears 11 mentioned in the first embodiment. A base frame 10 is provided with two crank pins 44, 45 as wire-withdrawal stoppers disposed between side walls 10a and 10b for preventing withdrawal of wires. Each of EA wires 43 as resistance wires made of a steel wire for resisting unwinding of the webbing has an end fixed to a portion of each wire groove 42 as shown in FIG. 12(a).

The other ends of the EA wires 43 are introduced downwardly in the base frame 10 to pass between the crank pins 44 and 45 so that the EA wires 43 are cranked by the crank pins 44, 45. The EA wires 43 have predetermined lengths after the cranked portions and the other ends of the EA wires 43 are free ends. The lengths of the EA wires 43 are designed to allow the reel shaft 102 to complete two revolutions during unwinding of the webbing.

Figure 12:
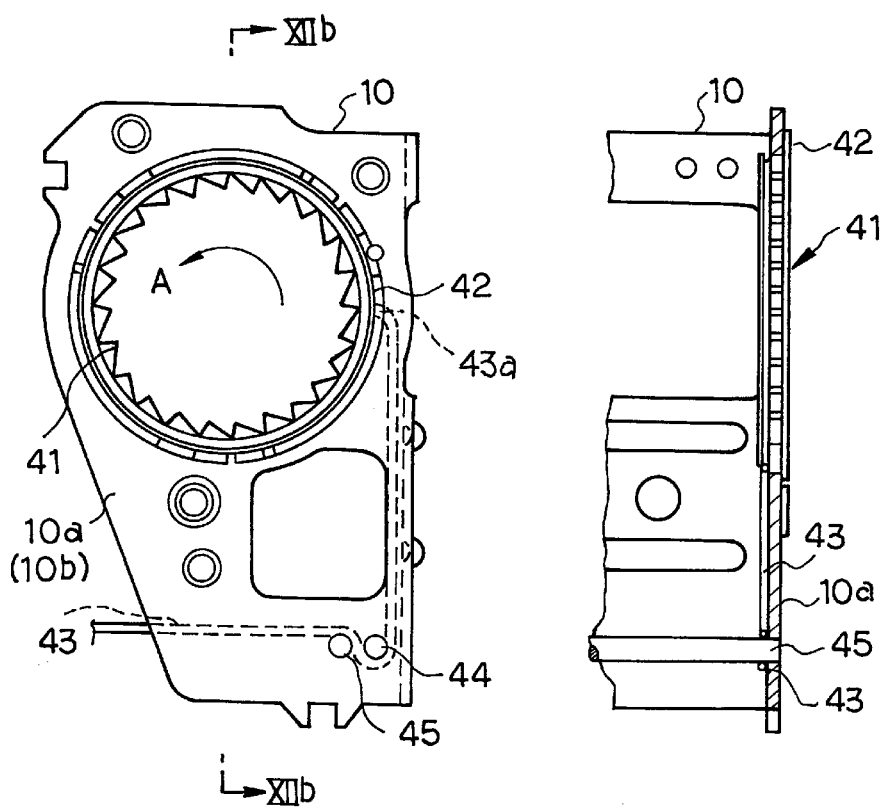
FIG. 12(a) is a side view showing the structure of the EA member shown in FIG. 11.
FIG. 12(b) is a part of sectional view showing the structure of the EA member.

As shown in FIG. 12(a), when the EA gears 41 rotate in the direction A, the EA wires 43 are wound along the wire grooves 42 and, at the middle thereof, pass between the crank pins 44 and 45 so as to be pulled out. At this point, since the EA wires 43 made of a steel wire are cranked at an acute angle by the crank pins 44, 45 which are spaced at a distance about the same as the diameter of the EA wires 43, the EA wires 43 are deformed over the wire deformable range, thereby producing resistance against the withdrawal of the EA wires 43. As mentioned above, when the reel shaft (not shown) suddenly rotates due to the sudden unwinding of the webbing, the resistance against the withdrawal of the EA wires 43 acts on EA gears 41.

Figure 13C:
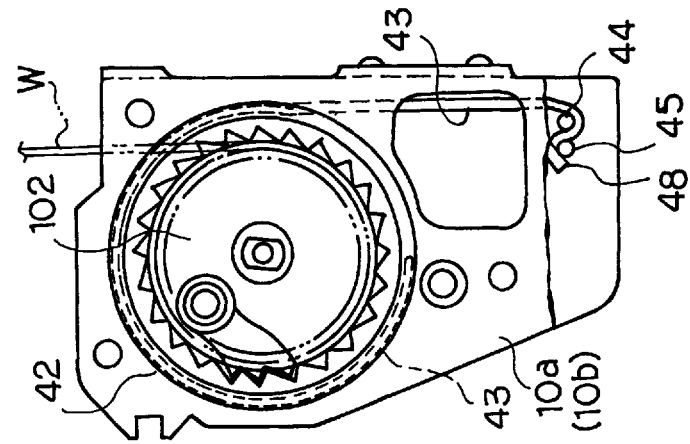
FIGS. 13(a)–13(c) are explanatory views illustrating the EA operation of the seat belt retractor fitted with the EA member according to the second embodiment.
Figure 13B:
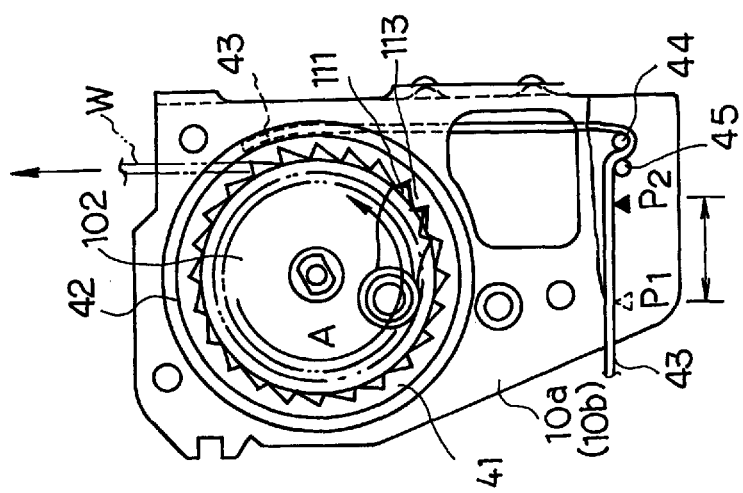
Figure 13A:
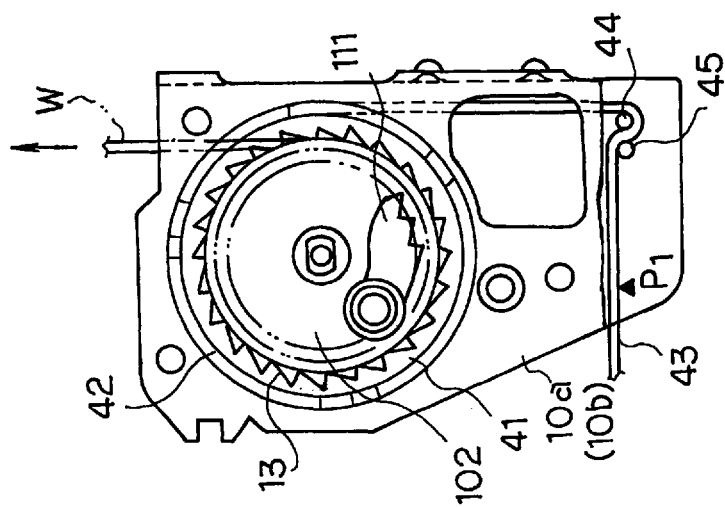

Referring to FIGS. 13(a)–13(c), the description will now be made as regard to the EA effect produced by the resistance against the withdrawal of the EA wires 43.

FIG. 13(a) is an explanatory view illustrating the normal operating state in which the webbing of the seat belt retractor is unwound or wound. In this state, the main pawl 111 does not engage with the internal teeth 13 so that the reel shaft 102 can freely rotate in the webbing winding direction and the webbing unwinding direction. Therefore, the EA gears 41 do not rotate at all in this state so that the EA wires 43 are stationary (see the point P1).

As shown in FIG. 13(b), as large forces are exerted on the webbing W, the load as reaction forces rotating the EA gears 41 in the direction A is increased so that the frictional engagements between the EA gears 41 and the peripheries of the side walls 10a, 10b are released. As a result of this, the EA gears 41 start to rotate in the direction A. At the same time, the EA wires 43 are wound along the wire grooves 42 corresponding to the rotational angle of the reel shaft 102 (the point P1-P2). At this point, the EA wires 43 pass between the crank pins 44 and 45 in the excessive bent state. Therefore, the webbing W is unwound with the EA load applied.

After an allowable length of the webbing E is unwound, stoppers 48 fixed to the ends of the EA wires 43 come to contact with the crank pins 44, 45 so that the unwinding of the webbing W is stopped.

According to the present invention, the EA load can be quantitatively suitably set according to the material of the EA wires. In addition, the labor for processing the members is reduced, thereby lowering the costs of the device as a whole.

(Variation of Second Embodiment)

Hereinafter, a variation of the second embodiment will be described referring to FIG. 14.

Figure 14:
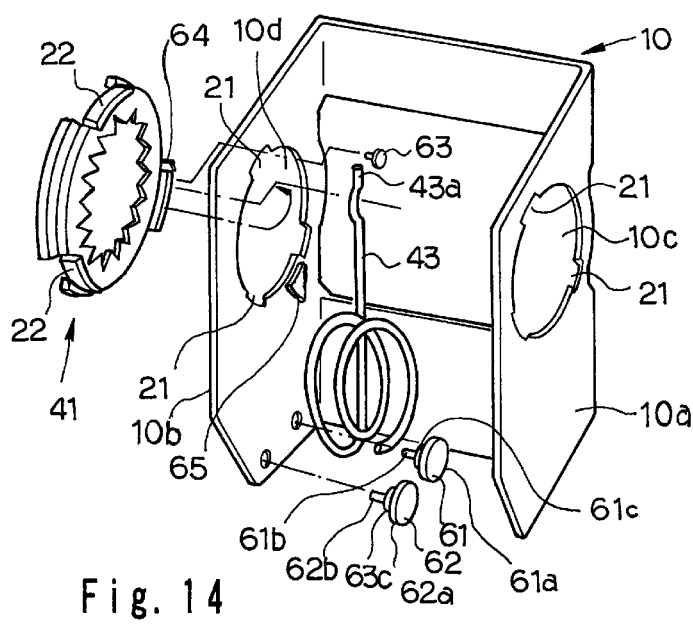
FIG. 14 is a partial perspective view showing an example of a structure of the base frame, in which an EA gear and an EA wire of an EA member are incorporated, according to a variation of the second embodiment.

As shown in FIG. 14, in this variation, two crank pins 61, 62 having different diameters are fixed to respective side walls 10a, 10b. EA wires 43 each having an end fixed to each EA gear 41 pass between the crank pins 61 and 62, respectively.

The EA gears 41 shown in FIG. 14 are mounted to the base frame 10 upon engaging positioning claws 22 of the EA gears to cutouts 21 formed on the peripheries of openings 10c, 10d of the base frame 10 in the same way as the second embodiment. At this point, the EA gears 41 are fitted rotatably in the peripheral direction of the openings 10c, 10d. The EA gears 41 in the initial state are locked from rotating by respective shear pins 63. It should be noted that FIG. 14 shows the EA gear 41 and the crank pins 61, 62 only on one side of the base frame 10 for the purpose of simplifying the illustration.

The end of the EA wire 43 is fixed to a portion of the outer periphery of the EA gear 41 fitted into the base frame 10. The EA wire 43 is a steel wire made of the same material as the second embodiment for resisting unwinding of the webbing. The EA wire 43 is formed in a coil-like configuration having a predetermined curvature as shown in FIG. 14.

The crank pins 61, 62 are rivets each having a flat top 61a, 62a and a step portion 61c, 62c formed integrally with the flat top 61a, 62a. The step portions 61c, 62c act as guide grooves between the side wall 10b and the tops 61a, 62a when insert portions 61b, 62b are inserted into fixing holes of the side wall 10b. The EA wire 43 is temporarily fixed at the middle thereof to be held by the step portions 61, 62b (see FIG. 15).

In this variation, an EA gear stopping mechanism comprising a stopper pin 64 and a stopper block 65 is disposed inside the side wall. The EA gear stopping mechanism prevents the EA gear 41 from rotating over a predetermined rotational angle or the predetermined number of revolution under the EA load.

Figure 15:
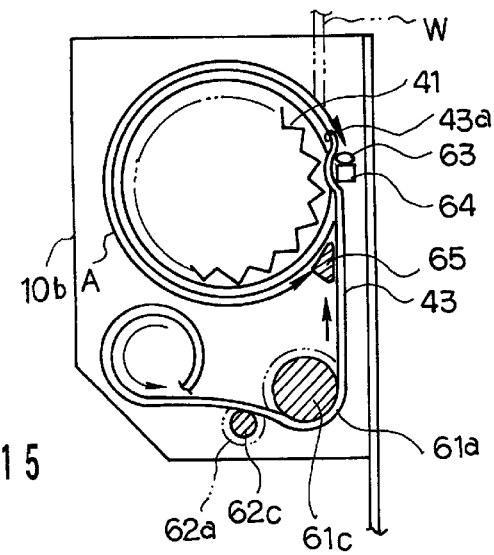
FIG. 15 is a side view of the EA member shown in FIG. 14, with the EA member partially sectioned.
Figure 16:
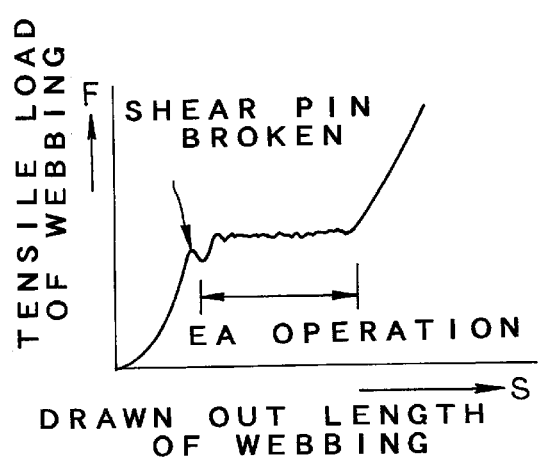
FIG. 16 is a graphical representation showing the relation between the tensile load and the drawn out length of the webbing during the EA operation of the EA member shown in FIG. 15.

Referring to FIG. 15 and FIG. 16, the description will now be made as regard to the EA effect according to this variation.

As mentioned in the second embodiment, when the webbing W is suddenly unwound, the reel shaft (not shown) around which the webbing W is wound also suddenly rotates. At the same time, the pawl (not shown) pivotally supported by the reel shaft pivots about the joint pin to engage with some of the internal teeth of the EA gear 41, thereby locking the rotation of the reel shaft. When the tensile load of the webbing becomes the EA load, the shear pin 63 stopping the rotation of the EA gear 41 is broken, thereby allowing the rotation of the EA gear 41 as shown in FIG. 16. As a result of this, the EA gear 41 winds up the EA wire 43 along the wire groove. At this point, the EA wire 43 is temporarily fixed by the crank pins 61, 62. Therefore, when the EA wire 43 passes through the cramp pin position, the EA load is exerted constantly during a predetermined length of the webbing is unwound (corresponding to EA operation in FIG. 16).

The stopper pin 64 is disposed near the shear pin 63 of the EA gear 41. The stopper pin 64 moves over the range A according to the rotation of the EA gear 41 to come to contact with the stopper block 65 as shown in FIG. 15, thereby stopping the rotation of the EA gear 41. The operation of the unwinding of the webbing after that is the same as the normal ELR.

The rotation of the EA gear 41 for unwinding the webbing can be set to obtain about one or more revolution by the setting of the EA gear stopping mechanism.

In the above description, the EA wire 43 is formed in a predetermined coil-like configuration. The EA load against the timing of unwinding of the webbing W is changeable upon adjusting the curvature of the coil-like configuration.

Figure 17:
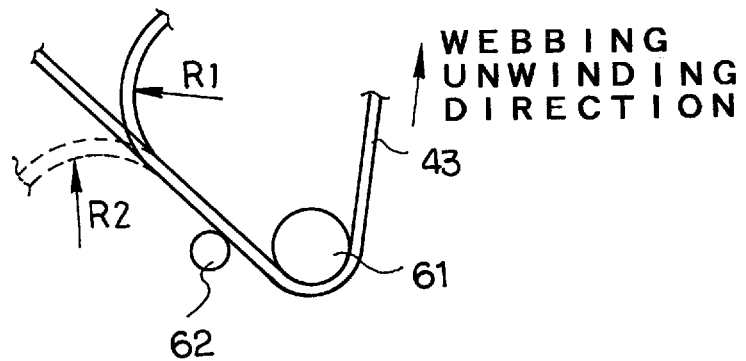
FIG. 17 is an explanatory view illustrating the relation between the bending configuration of the EA wire and the EA load.

That is, as shown in FIG. 17, assuming that the EA wire 43 passing through the crank pin position formed in a straight-line is standard, the contact resistance between the EA wire and the crank pin 62 is reduced when the EA wire is bent upwardly (R1) so that the EA wire 43 easily passes between the crank pin 61 and 62 and the EA load is also reduced, while the contact resistance between the EA wire and the crank pin 62 is increased when the EA wire is bent downwardly (R2) as shown by dotted lines so that the EA load is also increased.

Figure 18:
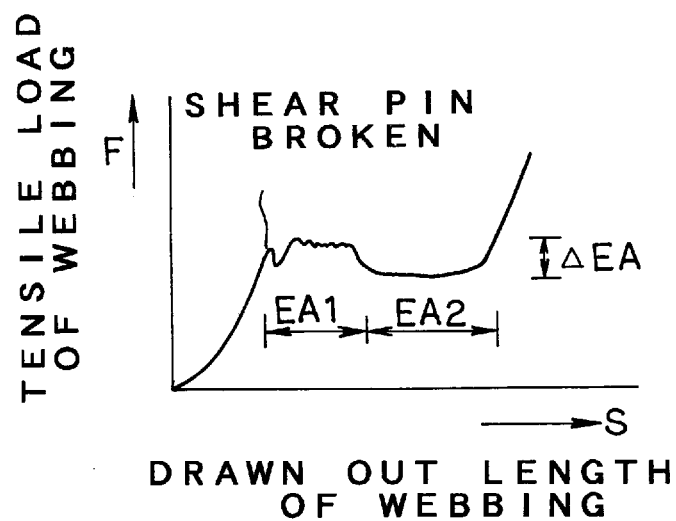
FIG. 18 is a graphical representation showing the relation between the tensile load and the drawn out length of the webbing during the EA operation according to the configuration of the EA wire shown in FIG. 17.

Because the EA load is controllable, for example, in a case of a vehicle with the seat belt device and an air bag device, the EA load can be set to be reduced by ΔEA (EA 1–EA 2) while a fixed degree of EA load (EA 1) is exerted on the unwinding of the webbing W to transmit the load of restraining an occupant to an air bag of the air bag device after the air bag is fully deployed as shown in FIG. 18.

(Third Embodiment)

Figure 19:
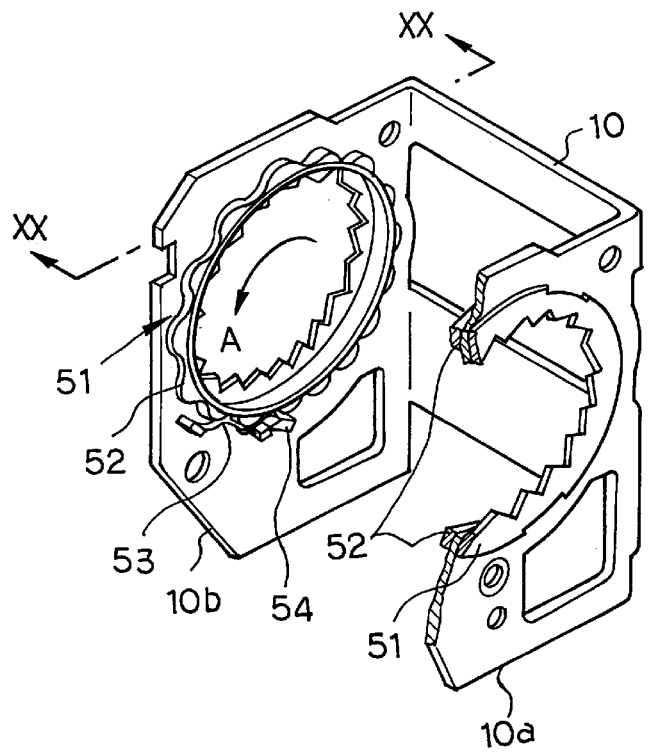
FIG. 19 is a partial perspective view showing an example of a structure of the base frame, in which an EA gear of an EA member is incorporated, according to a variation of a third embodiment.
Figure 20:
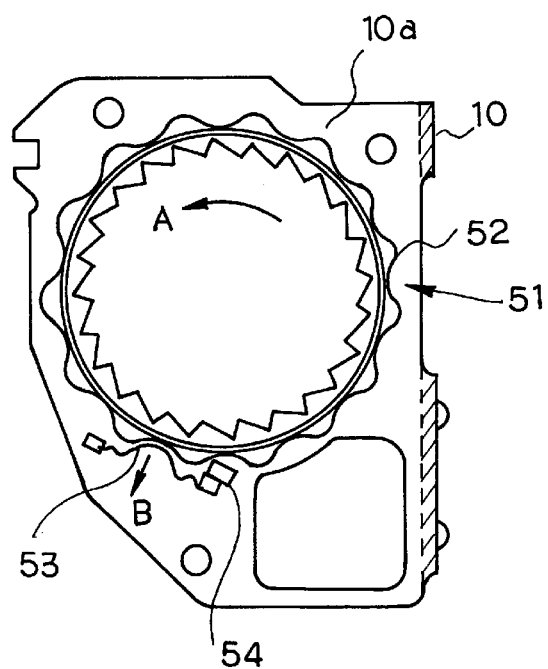
FIG. 20 is a partial sectional view showing a combination between exterior teeth of the EA gear and a steel spring shown in FIG. 19.

This embodiment employs EA gears 51 each having an outer periphery having external teeth like a sine curve as shown in FIG. 19 and FIG. 20.

The EA gears 51 according to this embodiment are fitted into openings 10c, 10d, respectively, upon engaging positioning claws 22 formed on the EA gears 51 to cutouts (not shown) formed in the side walls 10a, 10b in the same way as the first and second embodiments. Each of the EA gears 51 has an external teeth portion 52 made up of teeth like a sine curve as shown in FIG. 19 and FIG. 20, which is positioned inside the base frame 10.

Plate springs 53 are fixed to the inner surfaces of the side walls 10a, 10b to be in contact with troughs of the external teeth portions 52. Stoppers 54 for stopping the rotation of the EA gears 51 are each disposed on the inner surface near the plate spring 53. The plate spring 53 is preferably made of steel or resin.

In the EA gear 51 as structured above, when the webbing (not shown) is suddenly unwound and the load reaches the predetermined EA load so that the EA gear 51 starts to rotate in the direction of arrow A, the external teeth portion 52 moves to push the plate spring 53 in the direction of arrow B. Since the EA gear 51 rotates with the crests of the external teeth portion 52 being in contact with the plate spring 53, the torque of the EA gear 51 is reduced. In this embodiment, the predetermined EA load can be exerted to the webbing since the EA gear 51 rotates successively deforming the plate spring 53.

What we claims is:

1. A seat belt retractor comprising;
   a reel shaft around which a webbing is wound,
   a base frame having sides and supporting said reel shaft between the sides,
   ring members attached to said sides and each having internal teeth around the periphery thereof
   locking means mounted on said reel shaft, which normally allows rotation of said reel shaft and, in operation, lock said webbing from unwinding upon stopping said reel shaft from rotating in a webbing unwinding direction by engaging with some of said teeth of said ring members,
   deceleration sensing means for sensing when a deceleration exceeding a predetermined threshold acts on a vehicle, and
   lock operating means for operating said locking means according to an operation of said deceleration sensing means, wherein
   when said locking means and said teeth of said ring members engage with each other to lock said webbing from unwinding and a tensile load exceeding a predetermined degree acts on said webbing, said ring members rotate in said webbing unwinding direction with a predetermined tensile load held on the webbing.

2. A seat belt retractor as claimed in claim 1, wherein said ring members rotate in said webbing unwinding direction while excising projections formed on said sides of said base frame.

3. A seat belt retractor as claimed in claim 1, wherein said ring members rotate in said webbing unwinding direction while deforming projections formed on said sides of said base frame.

4. A seat belt retractor as claimed in claim 1, wherein said ring members rotate in said webbing unwinding direction with at least one resistance wire being deformed by a wire-withdrawal stopper disposed in said base frame, an end of said resistance wire being fixed to a portion of outer periphery of said ring member.

5. A seat belt retractor as claimed in claim 1, wherein said ring members have external teeth formed around at least one of outer peripheries thereof and at least one plate spring fixed to an inner surface of said base frame at a predetermined position, and wherein said ring members rotate in said webbing unwinding direction with said plate spring pushed by said external teeth.

6. A seat belt retractor as claimed in claim 1, wherein said locking means comprises a main pawl which is capable of engaging with some of internal teeth of one of said ring members by an operation of said lock operating means and a backup pawl which is fixed to transmitting means for transmitting rotation of said lock operating means and is capable of engaging with some of internal teeth of the other of said ring members by the rotation transmitted through said transmitting means, and wherein said both ring members are fitted into corresponding openings of said base frame, respectively.

* * * * *